UNITED STATES PATENT OFFICE 2,016,013

DYESTUFFS OF THE OXAZINE SERIES AND THEIR PRODUCTION

Georg Kränzlein, Heinrich Greune, and Max Thiele, Frankfort-on-the-Main, Germany, assignors to General Aniline Works, Inc., New York, N. Y., a corporation of Delaware No Drawing. Application October 10, 1930, Serial No. 487,900. In Germany October 19, 1929

16 Claims. (Cl. 260—28)

The present invention relates to new dyestuffs and a process of preparing them.

We have found that dyestuffs of good fastness properties are obtained by causing a halogenating agent to act upon a compound of the following probable formula:

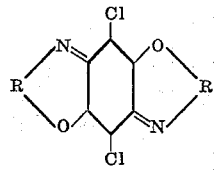

wherein R stands for an aromatic or heterocyclic radical bound by two adjacent carbon atoms, and, if required, subjecting the products thus obtained to the action of concentrated sulfuric acid. The reaction preferably is carried out in the presence of a solvent or a diluent such, for instance, as organic or inorganic liquids as nitrobenzene, fluorsulfonic acid, sulfuric acid and others and in many cases with addition of a catalyst capable of promoting halogenating processes such, for instance, as iodine sulfur, antimony or the like. As halogenating agents there may be used chlorine, bromine or agents splitting off halogen such, for instance, as sodium hypochlorite, sodium hypobromite or the like. When the reaction is carried out in the presence of an inorganic diluent as, for instance, sulfuric acid, the reaction products are obtained in a finely divided state in which they are advantageously to be used as pigment dyes. For the further treatment with a sulfonating agent there may be used concentrated sulfuric acid, oleum or the like.

The products obtained according to our new process correspond with the following general formula

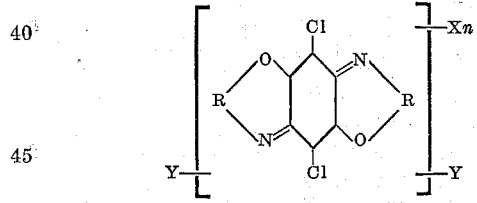

wherein
R stands for an aromatic or heterocyclic radical bound by two adjacent carbon atoms,
X for bromine or chlorine,
n for one of the numbers 1 to 6 and
Y for hydrogen or a sulfo group, the position of the substituents X and Y being undetermined.

They are valuable dyestuffs. They may be used as pigments for dyeing paper, wall papers, varnishes and rubber, or, after the introduction of a sulfo group, as acid dyestuffs and substantive dyestuffs. The inorganic insoluble salts of these sulfonic acids are valuable lake colors and the soluble salts prepared by means of organic bases are well adapted for coloring spirit-, cellon- and celluloid-lacquers.

The starting materials used in the present process may, for instance, be obtained by heating diarylamino derivatives of halogenated 1,4-benzoquinones or of 1,4-benzoquinones of the following formula

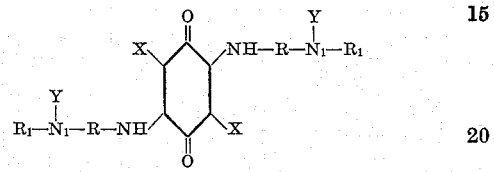

wherein

X stands for hydrogen or halogen,
Y for hydrogen or alkyl,
R and $R_1$ stand for the same or different aryl radicals and wherein the aryl-radicals R and $R_1$ may together with the nitrogen atom $N_1$ form a carbazol ring system, either alone or in the presence of a solvent of a high boiling point, if desired, with addition of a metal halogenide, as described in the copending application Ser. No. 364,316, filed on May 18, 1929 in the name of Georg Kränzlein, Heinrich Greune and Max Thiele.

The following examples illustrate the invention, but they are not intended to limit it thereto, the parts being by weight:

(1) 118 grams of the condensation product obtainable by boiling 2,5-di-(N-ethylcarbazolyl-3'-amino)-3,6-dichloro-1,4-benzoquinone with a solvent of high boiling point, are heated with 1500 parts of nitrobenzene to boiling temperature while adding 64 parts of bromine drop by drop, and the liquid is kept boiling until the evolution of hydrobromic acid is finished. After cooling, the brominated dyestuff is filtered with suction, washed and dried and precipitated from its solutions in concentrated sulfuric acid. It contains about 2 atoms of bromine. It is a dark-violet powder which dissolves in concentrated sulfuric acid with a bluish violet coloration. It melts above 300° C. By using larger quantities of bromine, higher brominated products are obtained.

In order to obtain the corresponding dyestuff rendered soluble by sulfonation, the brominated substance is introduced in 8 times its weight of concentrated sulfuric acid and the whole is warmed. The solution is then poured in water, filtered and the solid matter is washed until neutral with a solution of sodium chloride. The blue dyestuff thus obtained is well suited to be used for dyeing paper, wool, silk, cotton, mixed fabrics, viscose or the like.

(2) 118 parts of the condensation product obtainable by boiling 2,5-di-(N-ethylcarbazolyl-3'-amino)-3,6-dichloro-1,4-benzoquinone with a solvent of a high boiling point, are introduced into sulfuric acid saturated with potassium sulfate and well stirred whereupon 80 parts of bromine are added. The reaction mass is then poured on ice. After filtering off and squeezing the brominated dyestuff a paste is obtained which can directly be used for dyeing purposes. The dyestuff contains about 2 atoms of bromine. On addition of a larger quantity of bromine tribromo compounds to tetrabromocompounds of similar properties are obtained.

(3) 65 parts of the condensation product obtainable by boiling 2,5-di-(N-benzylcarbazolyl-3'-amino)-3,6-dichloro-1,4-benzoquinone with a solvent of high boiling point, are introduced into 500 parts of fluorosulfonic acid. To this solution there are slowly added 48 parts of bromine in small portions. The solution is poured on ice and then filtered; the solid matter is washed and can directly be used as dyestuff paste. It represents a pigment which dyes paper beautiful blue tints and which may be used for the manufacture of blue wall-paper and blue varnish coatings.

(4) 45 parts of the condensation product obtainable from 2,5-di-(β-naphthylamino)-dichloro-1,4-benzoquinone are suspended or dissolved in 5000 parts of boiling nitrobenzene. After addition of 5 parts of iodine the desired quantity of gaseous chlorine is introduced. The dyestuff is isolated by filtration. It crystallizes in dark green needles melting above 300° C. It dissolves in concentrated sulfuric acid to a blue solution. By heating the dyestuff obtained with 10 times its quantity of oleum of 20% strength, the corresponding sulfonic acid is obtained dyeing wool, silk, cotton paper, viscose, mixed fabrics etc., beautiful violet tints which are distinguished by their good fastness to light.

(5) 60 parts of the condensation product obtainable from 2,5-di-(N-methylcarbazolyd-3'-amino)-3,6-dichloro-1,4-benzoquinone are introduced into a mixture of 900 parts of sulfuric acid with 32 parts of bromine, the whole is stirred for 5 hours and then poured on ice. By filtering with suction a dyestuff is obtained which contains about 4 bromine atoms. In a finely divided state it is a pigment dyeing intense blue tints and being important for the manufacture of paper, wall papers and varnishes.

We claim:

1. The process which comprises reacting upon a compound of the following formula

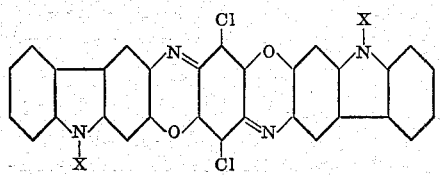

wherein X stands for hydrogen, alkyl or benzyl with bromine or chlorine in the presence of an inert liquid diluent.

2. The process which comprises reacting upon a compound of the following formula

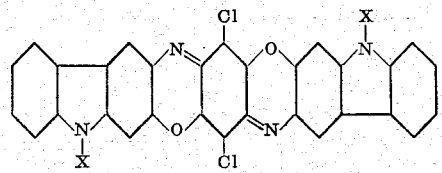

wherein X stands for hydrogen, alkyl or benzyl with bromine or chlorine in the presence of an inert liquid diluent and a catalyst capable of promoting halogenating processes and causing concentrated sulfuric acid to act upon the compound thus obtained.

3. The process which comprises reacting upon a compound of the following formula

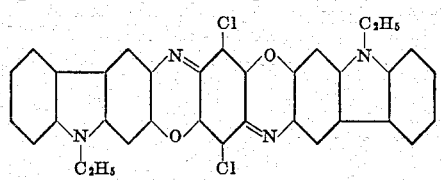

with bromine in the presence of sulfuric acid saturated with potassium sulfate.

4. The process which comprises reacting upon a compound of the following formula

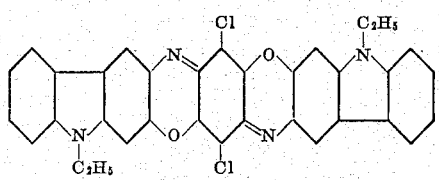

with bromine in the presence of sulfuric acid saturated with potassium sulfate and causing concentrated sulfuric acid to act upon the compound thus obtained.

5. The process which comprises reacting upon a compound of the following formula

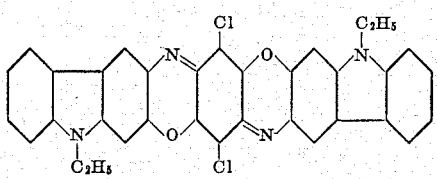

with bromine in the presence of nitrobenzene.

6. The process which comprises reacting upon a compound of the following formula

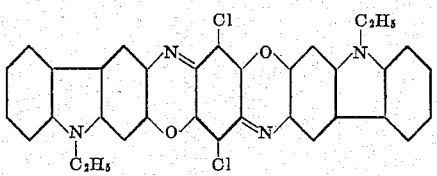

with bromine in the presence of nitrobenzene and causing concentrated sulfuric acid to act upon the compound thus obtained.

7. The compounds of the following formula

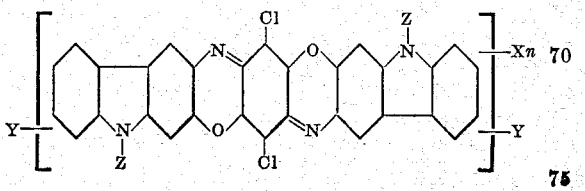

wherein
- Z stands for hydrogen, alkyl or benzyl,
- X stands for bromine or chlorine,
- $n$ for one of the numbers 1 to 4 and
- Y for hydrogen or a sulfo group being valuable pigment dyestuffs or in the form of the inorganic insoluble salts of the sulfonic acids good dyestuffs for lacquers.

8. The compounds of the following formula

[structural formula with Cl, $C_2H_5$, $C_2H_5$, Cl substituents, Y and $X_n$ groups]

wherein
- X stands for bromine or chlorine,
- $n$ for one of the numbers 2 or 4 and
- Y for hydrogen or a sulfo group being valuable pigment dyestuffs or in the form of the inorganic insoluble salts of the sulfonic acids good dyestuffs for lacquers.

9. The compound of the following formula

[structural formula with Cl, $C_2H_5$, $C_2H_5$, Cl substituents, Y and $Br_2$ groups]

wherein Y stands for hydrogen or a sulfo group being a dark violet powder dissolving in concentrated sulfuric acid with a bluish-violet coloration melting at above 300° C. and being in the form of the sulfo compound a blue powder which is well adapted for dyeing paper, wool, silk, cotton or the like.

10. The compound of the following formula

[structural formula with Cl, $C_6H_5$—$CH_2$, $C_6H_5$—$CH_2$, Cl substituents, Y and $Br_2$ groups]

wherein Y stands for hydrogen or a sulfo group, dissolving in concentrated sulfuric acid to a blue solution melting at above 300° C. and dyeing from sulfuric acid the animal fiber blue tints.

11. The process which comprises reacting upon a compound of the following formula

[structural formula with Cl, R, R, Cl substituents]

wherein R stands for a carbazole radical bound by two adjacent carbon atoms with a halogenating agent.

12. The process which comprises reacting upon a compound of the following formula

[structural formula with Cl, R, R, Cl substituents]

wherein R stands for a carbazole radical bound by two adjacent carbon atoms with a halogenating agent in the presence of an inert liquid diluent and a catalyst capable of promoting halogenating processes.

13. The process which comprises reacting upon a compound of the following formula

[structural formula with Cl, R, R, Cl substituents]

wherein R stands for a carbazole radical bound by two adjacent carbon atoms with a halogenating agent in the presence of an inert liquid diluent and a catalyst capable of promoting halogenating processes and causing concentrated sulfuric acid to act upon the product thus obtained.

14. The process which comprises reacting upon a compound of the following formula

[structural formula with Cl, R, R, Cl substituents]

wherein R stands for a carbazole radical bound by two adjacent carbon atoms with a halogenating agent in the presence of an inert liquid diluent.

15. The process which comprises reacting upon a compound of the following formula

[structural formula with Cl, R, R, Cl substituents]

wherein R stands for a carbazole radical bound by two adjacent carbon atoms with a halogenating agent in the presence of an inert liquid diluent and causing concentrated sulfuric acid to act upon the product thus obtained.

16. The compounds of the following formula

[structural formula with Cl, R, R, Cl substituents, Y and $X_n$ groups]

wherein
- R stands for a carbazole radical bound by two adjacent carbon atoms,
- X for bromine or chlorine
- $n$ for one of the numbers 1 to 6 and
- Y for hydrogen or a sulfo group, the position of the substituents X and Y being undetermined being valuable pigment dyestuffs or in the form of the inorganic insoluble salts of the sulfonic acids good dyestuffs for lacquers.

GEORG KRÄNZLEIN.
HEINRICH GREUNE.
MAX THIELE.